United States Patent Office 2,971,942
Patented Feb. 14, 1961

2,971,942

EPOXIDE RESINS

John E. Masters and Harold G. Cooke, Jr., Louisville, Ky., assignors to Devoe & Raynolds Company, Inc., Louisville, Ky., a corporation of New York No Drawing. Filed Oct. 1, 1956, Ser. No. 612,974

10 Claims. (Cl. 260—2)

This invention relates to the manufacture of epoxide resins which are useful in the coatings, molding, adhesive and other fields.

The invention relates more particularly to the production of epoxide resins from cyanuric acid by reacting cyanuric acid with epichlorhydrin in the presence of a monohydric phenol, or a monoepoxide, or both, and in the presence of a catalyst to form chlorhydrin derivatives which are then subjected to dehydrohalogenation to form the epoxide resins.

In prior application Ser. No. 542,103, now Patent No. 2,809,942, the manufacture of epoxide resins is described by the reaction of cyanuric acid with epichlorhydrin to form polychlorhydrin cyanurates, which are then subjected to dehydrohalogenation to form the polyglycidyl cyanurates.

High molecular weight epoxide resins are difficult to prepare from cyanuric acid and epichlorhydrin, due to excessive cross-linking during the formation of the polychlorhydrins and their dehydrohalogenation to form polyepoxides.

The present invention has for an object the modification of such epoxy resins to decrease their functionality.

According to the present invention, the reaction of cyanuric acid with epichlorhydrin to form chlorhydrin cyanurates is modified by the addition of a monohydric phenol, or a monoepoxide, or both, to the mixture of cyanuric acid and epichlorhydrin which is reacted to form the chlorhydrin derivatives, and with resulting modification of the epoxide resins produced by dehydrohalogenation in such a way that they contain in combined form the residue of the monohydric phenol or monoepoxide used in their preparation.

The process of the present invention is a two-step process in which cyanuric acid is first reacted with epichlorhydrin in the presence of a monohydric phenol or a monoepoxide and in the presence of an organic solvent and a catalyst to produce an intermediate chlorhydrin derivative which is then subjected to dehydrohalogenation to form the epoxide resin.

Epoxide resins differing in their functionality can be produced by the process of the present invention by varying the proportions of cyanuric acid, epichlorhydrin and monohydric phenol or monoepoxide, including products which are essentially polyepoxides, such as diepoxides, or which are made up largely of polyepoxides, as well as products which are monoepoxides or mainly monoepoxides, and products which are mixtures in varying proportions of diepoxides and monoepoxides.

Thus, for each mol of cyanuric acid, the monohydric phenol can be varied from less than 1 mol up to about 2 mols with the use of about 3 mols or somewhat less of epichlorhydrin, in the first step of the process. And monoepoxides can similarly be varied from less than 1 mol up to about 2 mols for each mol of cyanuric acid and with the use of an amount of epichlorhydrin varying inversely with the amount of monoepoxide, e.g., about 2 mols of epichlorhydrin with 1 mol of monoepoxide to about 1 mol of epichlorhydrin with 2 mols of monoepoxide, in the first step of the process.

One important class of epoxide resins are those which are polyepoxides or mainly polyepoxides, such as monomeric diepoxide resins or partially polymerized products.

In making such polyepoxides, there is advantageously used, for each mol of cyanuric acid, up to 1 mol of monohydric phenol, and advantageously less than 1 mol of phenol, and from about 3, or somewhat more than 3, to about 2.65 mols of epichlorhydrin. When a monoepoxide is used with the cyanuric acid, a similar proportion of monoepoxide, up to 1 mol, and advantageously less than 1 mol, can be used for each mol of cyanuric acid, and from about 3.0 to about 1.65 mols of epichlorhydrin, to produce polyepoxide resins.

A typical polyepoxide resin product in monomeric form is illustrated by the following formula:

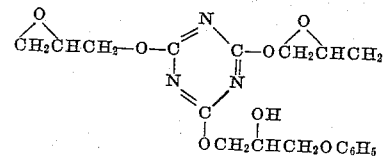

Such a monomeric product, or a reaction product containing such a monomeric product, can be produced by the use of either a monohydric phenol or a monoepoxide. For example, the reaction of 1 mol of cyanuric acid and 1 mol of phenol with 3 mols of epichlorhydrin results in formation of e.g., the chlorhydrin ether of phenol and of a polychlorhydrin ether of cyanuric acid, and the dehydrohalogenation of this mixture gives a product of the typical formula illustrated above, or a somewhat polymerized or hydrolyzed product.

Similarly, the reaction of 1 mol of cyanuric acid with 2 mols of epichlorhydrin and 1 mol of the monoglycidyl ether of phenol results in the production of the product illustrated by the above typical formula, or a somewhat polymerized product, the monoepoxide (monoglycidyl ether of phenol) reacting e.g., with one of the hydroxyls of the cyanuric acid, and the 2 mols of epichlorhydrin forming e.g., the dichlorhydrin ether which, on dehydrohalogenation, gives the diepoxide, or a somewhat polymerized or hydrolyzed product.

For the production of products which are monoepoxides or mainly monoepoxides, different proportions of cyanuric acid, epichlorhydrin and monohydric phenol or monoepoxide will be used. The monomeric monoepoxide or an epoxide resin made up mainly of monomeric monoepoxide can thus be produced by reacting 1 mol of cyanuric acid with 1 mol of epichlorhydrin and 2 mols of a monoepoxide, or by reacting 1 mol of cyanuric acid with 3 mols of epichlorhydrin and 2 mols of a monohydric phenol; and by dehydrohalogenating the reaction product.

A typical monoepoxide resin product in monomeric form is illustrated by the following formula:

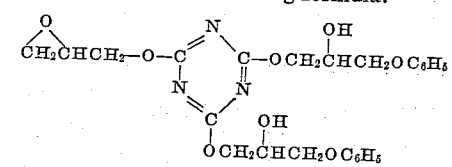

Such a monomeric product, or a reaction product containing such a monomeric product, can be produced by the use of either a monohydric phenol or a monoepoxide. For example, the reaction of 1 mol of cyanuric acid and 2 mols of phenol and 3 mols of epichlorhydrin results in the formation of e.g. the chlorhydrin ether of the phenol and a monochlorhydrin ether of cyanuric acid, and the dehydrohalogenation of this mixture gives a product of the typical formula illustrated above, or a somewhat polymerized or hydrolyzed product. Similarly, the reaction of 1 mol of cyanuric acid with 2 mols of the monoglycidyl ether of phenol and 1 mol of epichlorhydrin, followed by dehydrohalogenation, results in the production of the monoepoxide illustrated by the above typical formula or a somewhat polymerized or hydrolyzed product, the 2 mols of monoepoxide (monoglycidyl ether of phenol) reacting e.g. with 2 of the hydroxyls of the cyanuric acid, and the 1 mol of epichlorhydrin reacting with the other hydroxyl of the cyanuric acid to form, e.g., the monochlorhydrin ether which, on dehydrohalogenation, gives the monoepoxide or a somewhat polymerized or hydrolyzed product.

By varying the proportions of monohydric phenol or monoepoxide and correspondingly varying the proportion of epichlorhydrin used with the cyanuric acid, epoxide resins can be obtained varying from products which are monoepoxides or mainly monoepoxides to products which are diepoxides or mainly diepoxides or even higher polyepoxide resins, and varying from products which may be monomeric or largely monomeric in character to products which are polymerized to a greater or less extent.

Thus, in making polymeric monoepoxides, 2 mols of cyanuric acid can be reacted with 2 mols of epichlorhydrin and 3 mols of a monoepoxide to form an intermediate chlorhydrin derivative which is subjected to dehydrohalogenation; or 2 mols of cyanuric acid can be reacted with 5 mols of epichlorhydrin and 3 mols of a monohydric phenol to form an intermediate chlorhydrin derivative which is then subjected to dehydrohalogenation. Even more complex reaction products can be produced, e.g., by reacting 3 mols of cyanuric acid with 3 mols of epichlorhydrin and 4 mols of monoepoxide to form the intermediate chlorhydrin derivative which is then subjected to dehydrohalogenation.

The result of using the monofunctional phenol or monoepoxide is to reduce the functionality, i.e., the number of epoxide groups in the epoxide resin produced, as compared with resins produced by the reaction of cyanuric acid and epichlorhydrin and dehydrohalogenation of the polychlorhydrin derivative so produced. As a result of using the monofunctional phenol or monoepoxide, instead of producing a product such as triglycidyl cyanurate, there is produced a product of reduced functionality such as a diepoxide or even a monoepoxide, or mixtures thereof in regulated proportions.

In general, in producing polyepoxides, the maximum amount of monohydric phenol or monoepoxide will be about 1 mol for each mol of cyanuric acid, with about 3 mols of epichlorhydrin when the phenol is used and 2 mols when the epoxide is used, so that two groups of the cyanuric acid on the average can react with the epichlorhydrin. Smaller proportions of monohydric phenol or monoepoxide are advantageously used, e.g., ½ mol per mol of cyanuric acid, or ⅓ or ¼ mol per mol of cyanuric acid, in which case a smaller proportion of the reactive groups of the cyanuric acid will react with the monoepoxide, and a smaller amount of monohydric phenol will be converted into the chlorhydrin ether and subsequently dehydrohalogenated to form a monoepoxide which can react with part of the cyanuric acid groups.

The first step of the process in which the epichlorhydrin is reacted with the cyanuric acid in the presence of the monohydric phenol or monoepoxide is advantageously carried out with catalysts including tertiary amines such as tripropyl amine and dimethyl aniline; quaternary ammonium hydroxides, such as benzyl trimethyl ammonium hydroxide; quaternary ammonium salts, such as benzyl trimethyl ammonium chloride; and quaternary ammonium ion-exchange resins.

Some dehydrohalogenation may take place during this first step of the process to form epoxy groups which react with other cyanuric acid groups to form more complex or polymeric products.

The second step of the process is the dehydrohalogenation of the intermediate chlorhydrin derivative produced by the first step. This is effected with the use of either anhydrous sodium hydroxide or an aqueous solution of sodium hydroxide. Other basic reagents such as potassium hydroxide, calcium hydroxide, sodium carbonate, etc., can also be used in this step. The reaction of dehydrohalogenation is slightly exothermic, but can be controlled and kept below 100° C. by cooling means such as indirect cooling by water. Water present in the reaction mixture is removed during or immediately following the dehydrohalogenation, by distillation of a part of the solvent. By-product salt and unreacted alkali are removed by filtration, and the product is isolated by removal of the solvent by vacuum distillation.

Various monohydric phenols can be used for modifying the reaction, and used in varying proportions as above indicated, including both mononuclear and polynuclear monohydric phenols, e.g., phenol, cresol, naphthols, etc. Various monoepoxides can also be used as modifying agents in the reaction, including e.g. butyl glycid ether, phenyl glycid ether, propylene oxide, the butylene oxides, or the monoglycid esters.

Particularly advantageous products are produced in the form of diepoxides, although products of higher functionality, including triepoxides and tetraepoxides, can be prepared by varying the proportions of the ingredients used.

Another typical and somewhat more complex monomeric diepoxide is illustrated by the following formula:

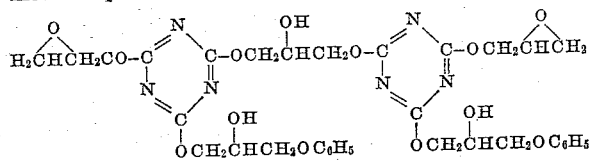

Such a product, or a reaction product containing such a product, can be prepared by the reaction of 2 mols of cyanuric acid, 2 mols of phenol and 5 mols of epichlorhydrin. Such a product, or a reaction product containing such a product, can also be prepared by the reaction of 2 mols of cyanuric acid, 3 mols of epichlorhydrin and 2 mols of the monoglycidyl ether of phenol.

When 1 mol of cyanuric acid is used with 1 mol of phenol and from 2⅓ to 3 mols o epichlorhydrin, products of the general nature of diepoxides, which may be partially polymerized or hydrolyzed, are obtained. With smaller proportions of monohydric phenol, triepoxides and tetraepoxides, which may be partially polymerized or hydrolyzed, can be obtained.

In general, when a monohydric phenol is used with the cyanuric acid and epichlorhydrin, approximately 3 mols of epichlorhydrin are advantageously used for each mol of cyanuric acid. When monoepoxides are used with the cyanuric acid and epichlorhydrin, the amount of epichlorhydrin used should, in general, be sufficient to react with the reactive groups of the cyanuric acid which do not react with the monoepoxide used.

Cyanuric acid has only limited solubility in most organic solvents. When it is admixed with epichlorhydrin and a monohydric phenol or a monoepoxide and an organic solvent, the finely divided cyanuric acid in suspension gradually and progressively dissolves and reacts to form the chlorhydrin cyanurates. Any excess of unreacted cyanuric acid can be removed by filtration from the solution of the chlorhydrin derivative formed; or, if not removed, the unreacted cyanuric acid may react with the glycidyl cyanurates during the subsequent dehydrohalogenation step of the process to form higher molecular weight products.

The reactions which take place will be somewhat different when monohydric phenols are used than when monoepoxides are used. The monohydric phenols will react with epichlorhydrin to form chlorhydrin derivatives at the same time that the cyanuric acid reacts with the epichlorhydrin to form chlorhydrin derivatives. And the subsequent dehydrohalogenation will convert the chlorhydrin derivatives of the phenol to monoepoxides which can react with cyanuric acid groups which have not been converted into chlorhydrin derivatives and which, on dehydrohalogenation, form glycidyl groups.

When a monoepoxide is used, it can react directly with the cyanuric acid, leaving a smaller number of cyanuric acid groups to react with the epichlorhydrin to form chlorhydrin derivatives. While the reactions are somewhat different, the results may be much the same, as above indicated. The glycidyl ether of phenol, formed by dehydrohalogenation of the chlorhydrin ether of phenol first formed, appears to react with the cyanuric acid in much the same way as when the glycidyl ether of phenol is added in the first step of the process with the corresponding reduction in amount of epichlorhydrin used.

The invention will be illustrated by the following examples, but it will be understood that the invention is not limited thereto.

The apparatus used was a 2-liter, 3-necked flask equipped with a stirrer, thermometer, reflux condenser electric heater and cooling means.

*Example 1.*—The first step of the process was carried out wtih the use of 64.5 gms. (0.5 mol) cyanuric acid, 138.8 gms. (1.5 mol) of epichlorhydrin, and 47 gms. (0.5 mol) of phenol, with 250 gms. of dioxane solvent and 5.2 gms. of a 60% (aqueous) solution of benzyl trimethyl ammonium chloride as a catalyst. This mixture was heated with stirring to 110° C. and held at this temperature until complete reaction took place, as indicated by a clear solution (about 5 hours).

The resulting solution was cooled to 50° C. and 62 gms. of solid sodium hydroxide added. The resulting mixture was heated to a temperature of 70° C., the source of heat removed, and the exotherm allowed to subside, and the temperature was kept within the range of 90–97° C. during the exotherm by application of a cold water bath. After cooling, the resin was filtered and the salt cake washed with dioxane and acetone, and the cake was dried. The filtrate and washing water were combined and distilled under a vacuum to a pot temperature of 100° C. at a pressure of approximately 2 mm. mercury. The resin produced had a melting point of 60° C., and had a weight per epoxide of 509.

*Example 2.*—In a similar manner, using the same solvent and catalyst and the same procedure, 64.5 gms. of cyanuric acid (0.5 mol), 92.5 gms. of epichlorhydrin (1.0 mol) and 75 gms. of phenyl glycidyl ether (0.5 mol) were reacted for a period of 10 hours and dehydrohalogenated as described in Example 1, using 42 gms. of sodium hydroxide, giving a resin with a melting point of 61° and a weight per epoxide of 447.

*Example 3.*—The reaction was carried out with the same reactants as in Example 2 except that 65.5 gms. (0.5 mol) of butyl glycidyl ether were used instead of phenyl glycidyl ether, the reaction time being 5 hours and, on dehydrohalogenation, using 42 gms. of sodium hydroxide, gave a resin with melting point of 46° C. and a weight per epoxide of 343.

*Example 4.*—64.5 gms. (0.5 mol) of cyanuric acid, 138.8 gms. (1.5 mols) of epichlorhydrin and 110 gms. (0.5 mol) of nonyl phenol were reacted in the manner described in Example 1 for a period of 6½ hours. The dehydrohalogenation was carried out with the addition of 62 gms. of sodium hydroxide at a temperature of 58–92° C., and gave a resin of a melting point of 57° C. and a weight per epoxide of 746.

*Example 5.*—In a similar manner to that illustrated in Example 1, 77.4 gms. of cyanuric acid (0.6 mol), 138.8 gms. of epichlorhydrin (1.5 mols) and 56.4 gms. (0.6 mol) of phenol were similarly reacted for 15 hours, the unreacted cyanuric acid filtered off, and the dehydrohalogenation was carried out with the addition of 58 gms. of sodium hydroxide at a temperature of 85–90° C., giving a resin of a melting point of 74° C., and a weight per epoxide of 836.

In this case, some of the cyanuric acid, 6.5 gms., did not react and was filtered off, the reacting ratio of epichlorhydrin to cyanuric acid being 2.65 to 1, which appears to be the limiting ratio of the system of this example.

*Example 6.*—The process was carried out with the same reactants as in Example 5, except that the amount of epichlorhydrin used was 129.5 gms. (1.4 mols), the reaction being carried out for 9 hours, unreacted cyanuric acid filtered off, followed by dehydrohalogenation by the addition of 58 gms. of sodium hydroxide at a temperature of 85–90° and giving a resin of melting point 70° C. and a weight per epoxide of 853.

In this example, 12.8 gms. of cyanuric acid remained unreacted, and the ratio of epichlorhydrin to cyanuric acid reacted was 2.65 to 1.

*Example 7.*—The process was carried out as in Example 1, using 77.4 gms. (0.6 mol) cyanuric acid, 147 gms. (1.59 mol) epichlorhydrin, and 56.4 gms. (0.6 mol) phenol, for a period of 20 hours. After filtering off the unreacted cyanuric acid, the dehydrohalogenation was carried out with the addition of 65.6 gms. of sodium hydroxide, at a temperature of 85–96° C., and gave a resin of melting point 72° C. and a weight per epoxide of 660.5.

In this example, 3.6 gms. of the cyanuric acid remained unreacted, and the ratio of epichlorhydrin to cyanuric acid reacted was 2.73 to 1.

*Example 8.*—The reaction was carried out as described in Example 1, using 96.8 gms. (0.75 mol) cyanuric acid, 138.8 gms. (1.5 mol) epichlorhydrin, and 56.3 gms. (0.375 mol) phenyl glycidyl ether, for a period of 14.5 hours. After filtering off unreacted cyanuric acid, the dehydrohalogenation was carried out with the addition of 63 gms. of sodium hydroxide, at a temperature of 90–97° C., and gave a resin having a melting point of 60° C. and a weight per epoxide of 463.7.

In this example, 7.5 gms. of cyanuric acid remained unreacted. The reaction ratio of epoxide (epichlorhydrin plus the glycidyl ether) to cyanuric acid was 2.70 to 1.

*Example 9.*—The same reactants were used as in Example 8, but in the proportions of 114.7 gms. (0.89 mol) cyanuric acid, 123.3 gms. of epichlorhydrin (1.33 mols) and 133.3 gms. of phenyl glycidyl ether (0.89 mol), the reaction being carried out for a period of 14 hours. The dehydrohalogenation, after filtering off unreacted cyanuric acid, was carried out with the addition of 55.5 gms. of sodium hydroxide at a temperature of 95–101° C., and gave a resin with a melting point of 63° C. and a weight per epoxide of 888.

In this example, 9.2 gms. of cyanuric acid remained unreacted and was filtered off. The reaction ratio of epoxide (epichlorhydrin plus glycidyl ether) to cyanuric acid was 2.71 to 1.

*Example 10.*—96.8 gms. (0.75 mol) of cyanuric acid, 138.8 gms. of epichlorhydrin (1.5 mols) and 37.5 gms. of phenyl glycidyl ether (0.25 mol) were reacted in the manner described in Example 1 for a period of 18 hours. Unreacted cyanuric acid was filtered off. The dehydrohalogenation was carried out with the addition of 63 gms. of sodium hydroxide at a temperature of 95–103° C., and gave a resin of melting point 60° C. and a weight per epoxide of 526.

11.0 gms. of cyanuric acid remained unreacted and was filtered off. The reaction ratio of epoxide to cyanuric acid was 2.64 to 1.

In the above examples, the weight per epoxide was higher than that of a product having the formulas above given, and indicated that some further reaction, such as polymerization or hydrolysis, had taken place during the process.

In the above examples, where some of the cyanuric acid remained unreacted, the reaction was held at a temperature of 110° C. until it appeared that no more cyanuric acid was going into solution, after which the mixture was cooled, the unreacted cyanuric acid filtered off, and the filtrate then dehydrohalogenated.

The above examples relate to the production of polyepoxide products such as diepoxides or partially polymerized diepoxides or more complex products. Examples 2, 3, 8, 9 and 10 illustrate the use of varying proportions of monoepoxide; from 1 mol of monoepoxide to 1 mol of the cyanuric acid, to ½ mol and ⅓ mol of monoepoxide per mol of cyanuric acid. Similar variations can be made in the amount of monohydric phenol used, from 1 mol of monohydric phenol per mol of cyanuric acid, as illustrated by Examples 1 and 4–7, to amounts of ½ mol of monohydric phenol or ⅓ mol of monohydric phenol per mol of cyanuric acid, and with the use of an amount of epichlorhydrin of about 3 mols or somewhat more or less per mol of cyanuric acid.

Products which are monoepoxides or mainly monoepoxides can similarly be made in accordance with the procedures of the foregoing examples but with change in the proportions of cyanuric acid, epichlorhydrin and monohydric phenol or monoepoxide used, and following the procedures illustrated by the above examples. Thus, 1 mol of cyanuric acid is reacted with 1 mol of epichlorhydrin and 2 mols of phenyl glycide ether or butyl glycide ether as the monoepoxide to form the intermediate chlorhydrin derivative which is then subjected to dehydrohalogenation. Similarly, 1 mol of cyanuric acid is reacted with 3 mols of epichlorhydrin and 2 mols of phenol to form the intermediate chlorhydrin derivatives of the cyanuric acid and of the phenol which are then subjected to dehydrohalogenation to form the monoepoxide product. More complex products can similarly be obtained using e.g. 2 mols of cyanuric acid, 2 mols of epichlorhydrin and 3 mols of phenyl glycide ether or butyl glycide ether as the monoepoxide; or by reacting 2 mols of cyanuric acid with 5 mols of epichlorhydrin and 3 mols of phenol; and by dehydrohalogenating the chlorhydrin products so formed.

The products produced by the process of the present invention differ in their properties and in their applications. The polyepoxide products such as the diepoxides, etc. are epoxide resins capable of reacting through their epoxide groups to effect cross-linking and for purposes where a polyepoxide resin is desired.

The products which are monoepoxides have a reduced functionality and are less reactive since they have only one epoxide group through which they can react. They can advantageously be used by blending with diepoxides to form cross-linked products or for other purposes where a reactive monoepoxide resin is desired.

It will thus be seen that the addition of the monofunctional reactant, i.e., the monohydric phenol or monoepoxide, to the reaction of cyanuric acid with epichlorhydrin results in decreasing the functionality of the epoxide resin produced as compared with products produced without the use of such monofunctional reactants. Epoxide resins can thus be produced with varying proportions of epoxide groups, particularly products of the nature of diepoxides or higher polyepoxides which can advantageously be used as polyepoxide resins; and also products of decreased functionality of the nature of monoepoxide resins, or mixtures of mono and diepoxide resins of varying degrees of functionality.

We claim:

1. The method of producing epoxide resins which comprises reacting with heat cyanuric acid with epichlorhydrin in admixture with an organic solvent for cyanuric acid and an organic base as a catalyst and in admixture with a monofunctional reactant selected from the class which consists of monofunctional monohydric phenols and monofunctional 1,2-monoepoxides to form chlorhydrins, and subjecting the chlorhydrins so produced to dehydrohalogenation with a dehydrohalogenating agent to form the epoxide resin, said monofunctional reactant being present in a sufficient amount so that each molecule of epoxide resin produced has reacted therewith at least one molecule of a monofunctional reactant.

2. The method according to claim 1 in which caustic alkali is used as the dehydrohalogenating agent.

3. The method of producing epoxide resins which comprises reacting with heat cyanuric acid with epichlorhydrin in admixture with monofunctional monohydric phenol, an organic solvent for cyanuric acid and an organic base as a catalyst, in the proportion of 1 mol of cyanuric acid, less than about 2 mols of monohydric phenol and from about 2.5 mols to about 3 mols of epichlorhydrin, to produce chlorhydrins, and subjecting the chlorhydrins so produced to dehydrohalogenation with a dehydrohalogenating agent to form the epoxide resin, said phenol being present in a sufficient amount so that each molecule of epoxide resin produced has reacted therewith at least one molecule of said monohydric phenol.

4. The method according to claim 3 in which caustic alkali is used as the dehydrohalogenating agent.

5. The method of producing epoxide resins which comprises reacting with heat cyanuric acid with epichlorhydrin in admixture with a monofunctional 1,2-monoepoxide, an organic solvent for cyanuric acid and an organic base as a catalyst, in the proportions of 1 mol of the cyanuric acid, less than about 2 mols of monoepoxide and from about 1 to 3 mols of epichlorhydrin, to produce chlorhydrins, and subjecting the chlorhydrins so produced to dehydrohalogenation with a dehydrohalogenating agent to form the epoxide resins, said monoepoxide being present in a sufficient amount so that each molecule of epoxide resin produced has reacted therewith at least one molecule of said monoepoxide.

6. The method according to claim 5 in which caustic alkalis are used as the dehydrohalogenating agents.

7. The method of producing epoxide resins which comprises reacting with heat cyanuric acid with epichlorhydrin in admixture with a monofunctional monohydric phenol, an organic solvent for cyanuric acid and an organic base as a catalyst, in the proportion of 1 mol of cyanuric acid, less than about 1 mol of monohydric phenol and from about 2.5 mols to about 3 mols of epichlorhydrin, to produce chlorhydrins, and subjecting the chlorhydrins so produced to dehydrohalogenation with a dehydrohalogenating agent to form the epoxide resin, said phenol being present in a sufficient amount so that each molecule of epoxide resin produced has reacted therewith at least one molecule of said monohydric phenol.

8. The method according to claim 7 in which caustic alkali is used as the dehydrohalogenating agent.

9. The method of producing epoxide resins which comprises reacting with heat cyanuric acid with epichlorhydrin in admixture with a monofunctional 1,2-monoepoxide, an organic solvent for cyanuric acid and an organic base as a catalyst, in the proportions of 1 mol of cyanuric acid, less than about 1 mol of monoepoxide and from about 1.5 to 3.0 mols of epichlorhydrin, to produce chlorhydrins, and subjecting the chlorhydrins so produced to dehydrohalogenation with a dehydrohalogenating agent to form the epoxide resins, said monoepoxide being present in a sufficient amount so that each molecule of epoxide resin produced has reacted therewith at least one molecule of said monoepoxide.

10. The method according to claim 9 in which caustic alkalis are used as the dehydrohalogenating agent.

References Cited in the file of this patent

UNITED STATES PATENTS

| | | |
|---|---|---|
| 2,581,464 | Zech | Jan. 8, 1952 |
| 2,741,607 | Bradley et al. | Apr. 10, 1956 |
| 2,809,942 | Cooke | Oct. 15, 1957 |